April 1, 1924.
H. H. LENOX
1,488,793
APPARATUS FOR CURING AND PRESERVING FRUITS, VEGETABLES, AND GRAINS
Filed Sept. 27, 1920    2 Sheets-Sheet 1
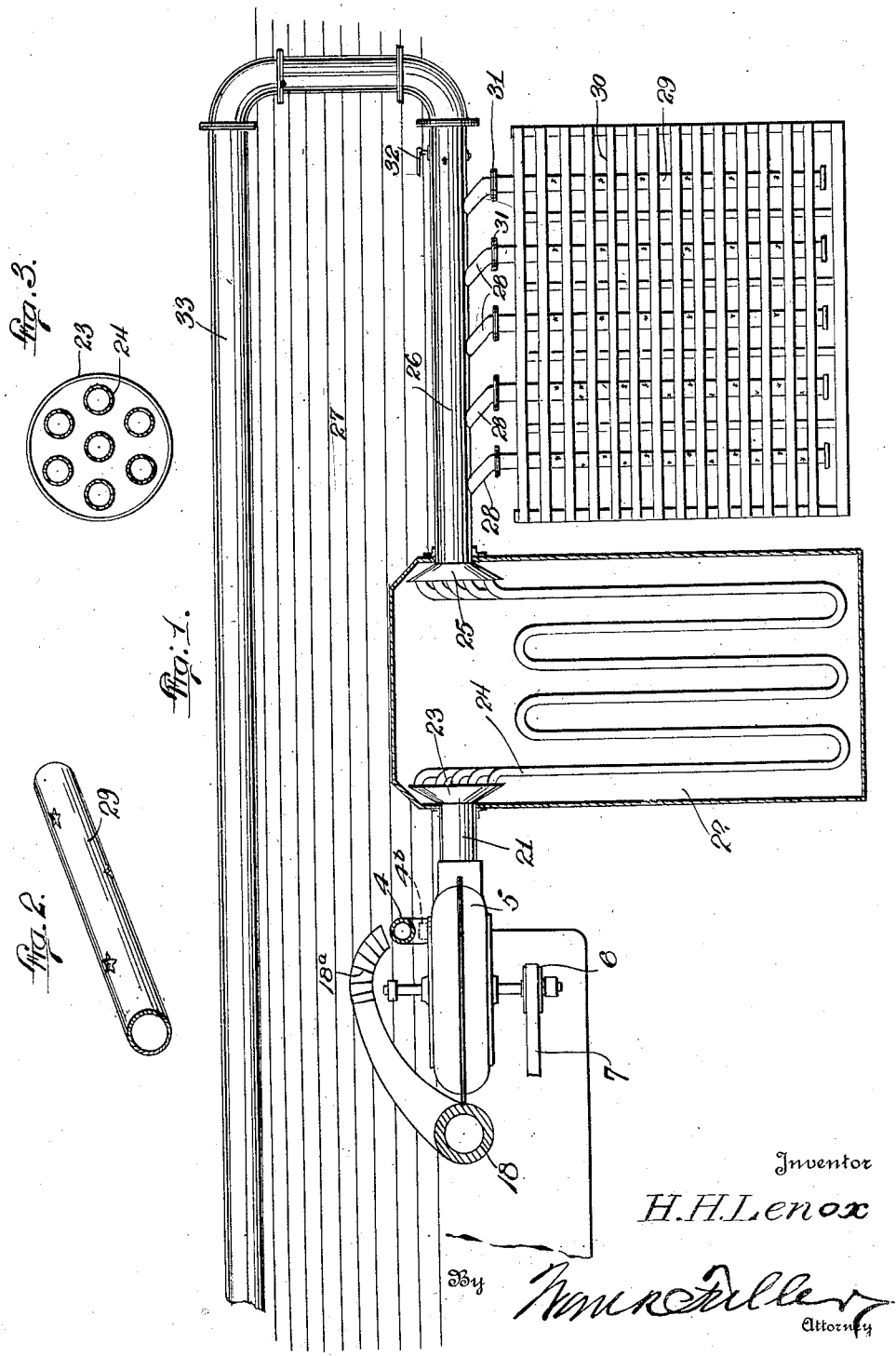
Inventor
H. H. Lenox
By [signature]
Attorney April 1, 1924.
H. H. LENOX
1,488,793
APPARATUS FOR CURING AND PRESERVING FRUITS, VEGETABLES, AND GRAINS
Filed Sept. 27, 1920   2 Sheets-Sheet 2
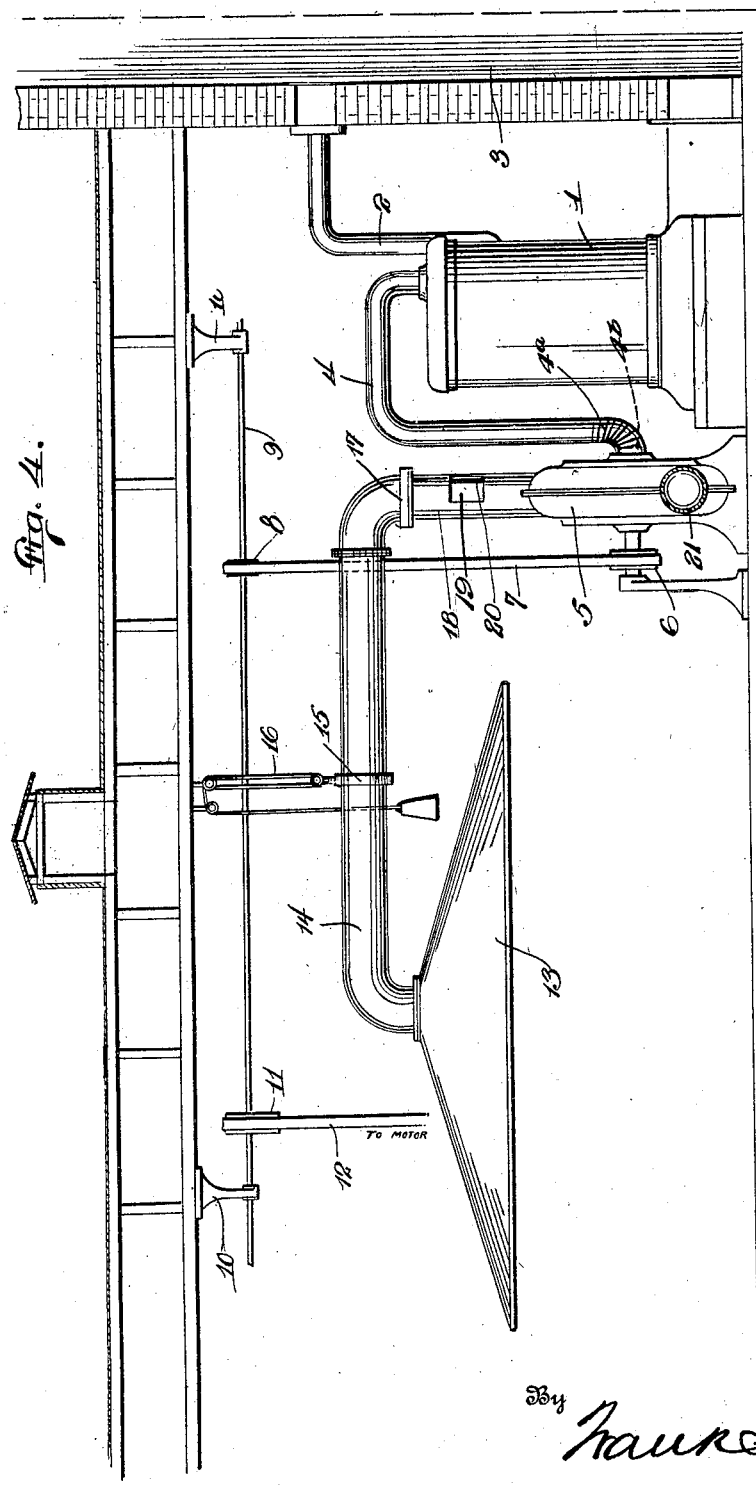
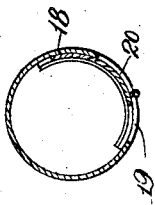
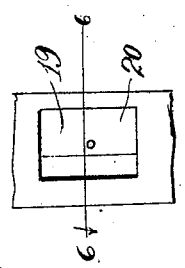
Inventor
H. H. Lenox
By Frank Fuller, Attorney Patented Apr. 1, 1924.

1,488,793

UNITED STATES PATENT OFFICE.

HENRY H. LENOX, OF SELMA, ALABAMA.

APPARATUS FOR CURING AND PRESERVING FRUITS, VEGETABLES, AND GRAINS.

Application filed September 27, 1920. Serial No. 412,916.

*To all whom it may concern:*

Be it known that HENRY H. LENOX, citizen of the United States, residing at Selma, in the county of Dallas and State of Alabama, has invented certain new and useful Improvements in Apparatus for Curing and Preserving Fruits, Vegetables, and Grains, of which the following is a specification.

This invention relates to improvements in apparatus for curing, preserving and drying vegetables, tobacco, fruits and grain.

The primary object of the invention is to provide an improved apparatus adapted to be installed in a store house whereby fruits, vegetables, tobacco or grain may be dried and maintained in a state of preservation during the time they are stored so that they will be sound and in good condition when ready for use.

The invention further contemplates the provision of drying means obtained from a heating unit and cooling means obtained from a cooling unit, the same being associated in a manner that will permit them to be used interchangeably according to the species of food products in the store house.

Other objects of the invention will appear upon consideration of the following detail description and accompanying drawings, wherein:—

Figure 1 is a plan view of a portion of the apparatus including some of the elements of the invention.

Figure 2 is a detail view of one of the distributing pipes.

Figure 3 is an end elevation of the receiving end of one of the conduit pipes showing the manner of connecting the cooling coils thereto.

Figure 4 is an elevation of a portion of the apparatus illustrating the heating and drying means.

Figure 5 is a detail view of the damper in one of the pipes, and

Figure 6 is a cross section on the line 6—6 of Fig. 5.

In practice, the apparatus will be installed in a store house or building where the food products, such as vegetables, fruits, tobacco or grain are to be stored and the heating unit 1 will be conveniently located and connected by a flue 2 to a brick chimney 3 which may be a smoke stack. The heating unit 1 may consist of a furnace or other suitable heating plant and has a heat conducting pipe 4 leading therefrom to a blower fan 5. The latter is suitably mounted and has its drive shaft equipped with a pulley 6 over which an obliquely disposed belt 7 is trained, the latter also passing over a pulley 8 on a shaft 9 suspended from the roof structure by hangers 10. A pulley 11 on the shaft receives a belt 12 which is driven by a suitable motor or engine located at any convenient place, (not shown).

A relatively large hood 13, substantially conical in formation, is suspended horizontally above the place where the vegetables, et cetera, are to be stored, and this hood is connected to a pipe 14 located in front of said belt 7 and which is hung by a ring 15 and a weighted cable 16 disposed in front of shaft 9 and suspended from the roof structure. A swivel connection 17 joins the pipe 14 with an upstanding pipe 18 so that the hood may be suspended over the products and may draw the air upwardly causing the air to percolate through the product and thus keep the constant circulation of air passing through the products. The upstanding pipe 18 leads to the fan to accomplish this purpose. The damper 19 consists of an opening formed in the pipe 18 and adapted to be closed by a sliding closure member 20 whereby the size of the opening may be regulated to regulate the quantity of external air drawn into the pipe and pipes 4 and 18 are selectively attachable to and detachable from the blower 5 in any conventional manner, forming no part of this invention and for instance by telescopic engagement of flexible terminals 4ª and 18ª respectively with a collar 4ᵇ of the blower.

As shown in Fig. 1 the fan 5 is also provided with a pipe 21 which extends into a cooling chamber 22 and has a large flared end 23 closed by a plate within which is provided a series of seven openings to receive the ends of a corresponding series of coils of pipe indicated at 24. The coils 24 are arranged within the cooling chamber 22 and their opposite ends are connected to a flared end 25 of a conduit 26. The flared end 25 is of the same construction as the flared end 23 of the pipe 21 and the seven coils are connected in the same manner. Obviously any greater or less number of coils may be provided if desired.

The conduit section 26 extends parallel with the aisle 27 and has a series of angular pipes 28 extending therefrom which are joined to distributing pipes 29 arranged in parallel relation and provided with a series of star shaped openings as shown in Fig. 2. These openings are disposed at an angle of forty-five degrees with respect to each other being scientifically located to produce the best results as is well known in the art.

A rack 30 formed of a lattice work of strips of wood, is disposed above the distributing pipes 29 and this rack is suitably supported in any preferred manner by standards or supports and so located that the swivelled hood may be swung into position directly above the rack. A blast gate 31 is located in each distributing pipe and a similar blast gate 32 is located in the pipe 26. The pipe or conduit 26 is also connected by suitable elbows and pipe connections with a parallel section 33 which extends along the opposite side of the aisle 27 and may be of any desired length according to the size and capacity of the storehouse to serve as a radiator for aisle 27.

By the use of my apparatus, material or commodities may be cooled for refrigerating or heated for drying according to a curing and preserving process while the same remain stored to overcome the necessity of frequently handling the same or changing the location thereof.

When the air is to be heated, as for drying, pipe 4 is connected to fan 5 and the latter is operated which inducts air through pipe 2 into the heater 1, through pipe 4, the fan 5, conduits 21, 24, 26 and pipes 29 onto the material. During this action, the pipe 18 is unconnected and cooler 22 lacks a refrigerant.

When the material is to be cooled, heater 1 is disconnected as at pipe 4, and pipe 18 is connected to fan 5 in place thereof, the air being drawn in through hood 13, pipes 14 and 18, fan 5, and forced through pipe 21 and coils 24, where the temperature of the air is reduced due to their disposition in cooler 22, and then discharged through pipe 26 and branches 28 and 29. The fan 5 in combination with hood 13 creates a suction to recirculate the air which I find requires less refrigerant, such as ice.

Minor changes may be made in the details of construction without departing from the spirit of the invention or the scope of the claims hereunto appended.

What I claim is:—

1. An apparatus of the character described comprising a heating unit, a blower fan, a pipe for detachably connecting the heating unit with the blower fan, a movable intake hood disposed horizontally and having its open mouth suspended in a relatively high plane, means for detachably connecting the hood with the said fan when the heating unit is disconnected, and permitting the hood to swing to various lateral positions, and means to movably suspend the hood in a movable position.

2. An apparatus of the character described comprising a heating unit, a blower fan, a pipe for detachably connecting the heating unit with the blower fan, an upstanding pipe for detachable connection with the fan, a conducting pipe swingingly connected to the upstanding pipe, an intake hood connected to the conducting pipe, and means to movably support the conducting pipe whereby the hood may be moved to various lateral positions.

In testimony whereof I affix my signature.

HENRY H. LENOX.